United States Patent [19]

Dressler et al.

[11] Patent Number: 5,072,785
[45] Date of Patent: Dec. 17, 1991

[54] CONVECTIVELY COOLED BOLT ASSEMBLY

[75] Inventors: Jeffrey T. Dressler, Jupiter; Deane A. Beytes, Tequesta; Gunther Eichhorn, Palm Beach Gardens, all of Fla.

[73] Assignee: United Technologies Corporation, Hartford, Conn.

[21] Appl. No.: 536,907

[22] Filed: Jun. 12, 1990

[51] Int. Cl.$^5$ .................... F02C 7/12; F16B 35/00
[52] U.S. Cl. .................... 165/47; 165/134.1; 60/39.83; 411/383; 411/546; 411/916
[58] Field of Search .................... 165/47, 134.1; 60/39.83; 411/383, 395, 916, 546, 338, 339

[56] References Cited

U.S. PATENT DOCUMENTS

| | | | |
|---|---|---|---|
| 2,320,398 | 6/1943 | Zetterquist | 411/916 |
| 3,199,294 | 8/1965 | Hagen | 60/39.75 |
| 3,654,989 | 4/1972 | Meier et al. | 165/47 |
| 4,064,691 | 12/1977 | Nash | 60/39.06 |
| 4,749,029 | 6/1988 | Becker et al. | 165/47 |
| 4,749,298 | 6/1988 | Bundt et al. | 165/134.1 |
| 4,820,097 | 4/1989 | Maeda et al. | 411/395 |
| 4,884,934 | 12/1989 | Ikeda et al. | 411/383 |
| 4,991,390 | 2/1991 | Shah | 60/39.36 |

Primary Examiner—John Rivell
Assistant Examiner—L. R. Leo

[57] ABSTRACT

Disclosed is a bolt assembly which includes two spacers having cooling channels defined therein which communicate with a central bore, and a bolt which extends through the bore of each spacer. The diameter of the shaft of the bolt is significantly less than either of the spacer bore diameters, allowing coolant entering the cooling channels of one spacer to circulate through the spacer bores and out the cooling channels of the other spacer, thereby cooling the bolt.

7 Claims, 1 Drawing Sheet

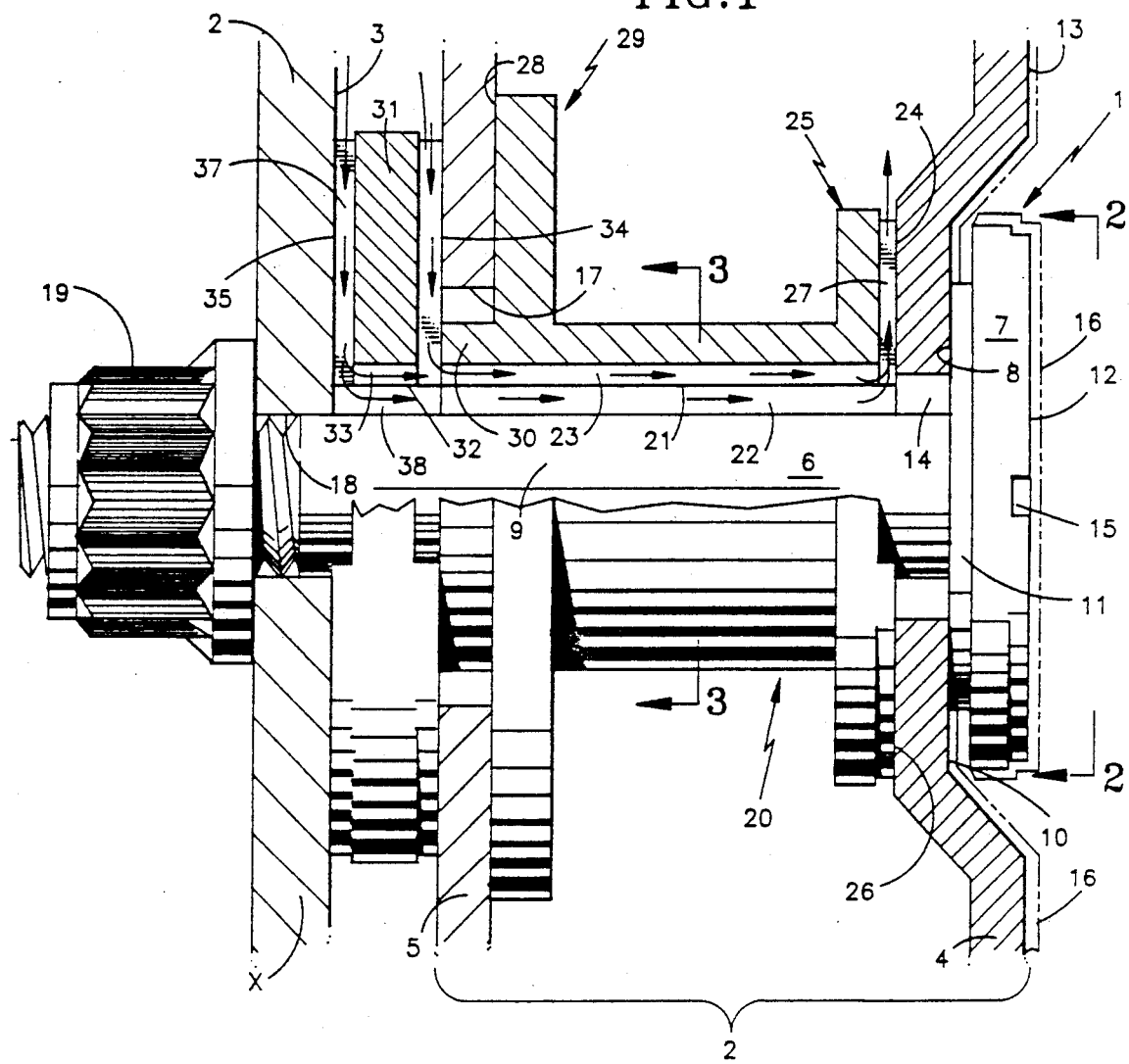

CONVECTIVELY COOLED BOLT ASSEMBLY

TECHNICAL FIELD

This invention relates to fasteners for use in high temperature environments, and particularly to convectively cooled fasteners.

BACKGROUND ART

Fasteners, such as nut and bolt assemblies, are used in a wide variety of devices. Use of such assemblies has achieved wide acceptance due to their high reliability and relatively low cost as compared to other fastening means. However, in some applications, such as liner assemblies on jet engine exhaust nozzles, the temperatures to which a fastener is exposed may exceed the fastener material's maximum allowable temperature, resulting in life reduction, or failure, of the fastener.

One solution to the problems posed by the high temperature environment would be to make such bolt assemblies using materials which inherently are able to withstand high temperatures with little or no detriment. However, present applications produce temperatures which are well above the maximum allowable temperature of most available materials from which bolt assemblies can be economically produced.

A more desirable solution to high temperature environments is to cool the bolt assembly so that the temperature of the bolt assembly material remains below the maximum allowable temperature thereof. Typically, such cooling is accomplished by circulating a coolant into contact with the bolt assembly, which coolant then absorbs heat from the bolt assembly. So long as the heat transfer rate from the bolt assembly to the coolant is no less than the heat transfer rate from the environment to the bolt assembly, the bolt assembly temperature can be effectively maintained below the maximum allowable temperature of the bolt assembly material.

In certain applications, such as liner assemblies on jet engine exhaust nozzles, the amount of coolant available is limited by engine performance considerations. Such liner assemblies may be secured to nozzle components by a plurality of bolt assemblies, each of which is cooled by the same coolant which has already been used to cool the liner assembly. Since the coolant temperature may rise dramatically as a result of cooling the liner assembly, the heat transfer rate from any given bolt assembly may not be sufficient to maintain that bolt assembly below its maximum allowable temperature.

DISCLOSURE OF THE INVENTION

It is therefore an object of the present invention to to provide means for cooling a bolt assembly for use in a high temperature environment.

Another object of the present invention is to provide means for delivering coolant at substantially the same temperature to cool each bolt assembly.

Another object of the present invention is to provide means for utilizing coolant which has not already been heated through cooling of components which the bolt secures.

Another object of the present invention is to provide means for maintaining bolt assemblies below the maximum allowable temperature without dramatically increasing the cost and weight of such assemblies.

According to the present invention, a bolt assembly is provided which includes two spacers, each of which includes a central bore. Each bore communicates with cooling channels in the spacers, and may include cooling channels integral with the bore itself which directly communicate with the cooling channels of the spacers. One of the spacers includes a stem which extends therefrom, and the shaft of the bolt extends through the bore of each spacer and the cooperates with a nut to sandwich the two spacers together with the stem interposed therebetween.

In use, the bolt assembly is secured to a first component, such as a liner assembly, and to a second component, such as a convergent disk assembly in a two-dimensional exhaust nozzle of a gas turbine engine. In such an application, the bolt secures both the liner assembly's cooling liner and impingement plate to the face of the disk assembly. The impingement plate is spaced from the liner by the spacers, and the stem extends through a hole in that plate. A pressure differential is established across the plate, and coolant is supplied to the cooling channels of the spacer located on the side of the plate having the higher pressure. The coolant flows through that spacer, into each of the bores and the integral cooling channels, and out the cooling channels of the other spacer, cooling the bolt shaft and the spacers.

When used on components such as liner assemblies for gas turbine engine exhaust nozzles, bolt assemblies of the present invention require only a fraction of the coolant available to that component, and the spent coolant from such a bolt assembly is available to further cool that component. Coolant is provided to each bolt assembly at substantially the same temperature, ensuring adequate cooling of each bolt assembly. Consequently, the present invention provides the desired cooling of bolt assemblies without substantially increasing the cost or weight of the bolt assembly.

The foregoing and other features and advantages of the present invention will become more apparent from the following description and accompanying drawings.

BRIEF DESCRIPTION OF DRAWINGS

FIG. 1 is a cross-section of a bolt assembly of the present invention as used to secure a liner assembly to the face of a disk assembly.

FIG. 2 is a view of the head of the bolt shown in FIG. 1 taken along line 2—2.

FIG. 3 is a view of the shaft of the bolt shown in FIG. 1 taken along line 3—3.

BEST MODE FOR CARRYING OUT THE INVENTION

A typical bolt assembly 1, according to the present invention, is shown in FIG. 1 attaching a component, such as a liner assembly 2, to the face 3 of a disk assembly X in a gas turbine engine exhaust nozzle, which is exposed to a high temperature environment. The liner assembly may include a liner 4, and an impingement plate 5 which provides jets of cooling air to impinge the liner 4. Although the following description discloses the present invention as used on a liner assembly of a gas turbine engine, it is disclosed as such for the purpose of example only, and is not intended to limit the scope of the claimed invention.

In the preferred embodiment, the bolt assembly 1 includes a bolt 6 having a head 7 with an integral washer face 8, and a bolt shaft 9. The head 7 of the bolt 6 may be received within a recess 10 in the liner assembly 2, the depth of which is essentially equal to the combined thickness of the head 7 and integral washer 11, so that after assembly the surface 12 of the head 7 is flush with the non-recessed outer surface 13 of the liner assembly 2. The diameter of the integral washer face 8 is substantially larger than the diameter of the recess hole 14 through which the shaft 9 extends, so that the integral washer face 8 will seal the recess hole 14 even if the bolt 6 is not centered therein.

As shown in FIG. 2, the head 7 of the bolt 6 preferably includes four perimeter notches 15 which are used to rotate the bolt 6 during assembly. The head 7 is preferably coated with a thermal barrier coating 16 to reduce heat transfer from the high temperature environment to the bolt 6. The perimeter notches 15 permit the liner assembly 2 to be assembled without incurring damage to the thermal barrier coating 16, damage which could occur if bolts having other notches, such as "Phillips head" notches, were used. The bolt 6 which secures the liner 4 extends through a hole 17 in the impingement plate 5, through a hole 18 in the face 3 of the disk assembly X, and is secured thereto by a nut 19.

The liner 4 is spaced from the impingement plate by a first spacer 20 that includes a first spacer bore 21 extending the length of the first spacer 20. As shown in FIG. 3, the diameter of the first spacer bore 21 is substantially larger than the diameter of the bolt shaft 9, providing a first spacer plenum 22 therebetween to permit passage of cooling air through the first spacer bore 21 despite the presence of the bolt shaft 9. To ensure that the flow of cooling air to portions of the first spacer 20 is not excessively impeded if the bolt shaft 9 is not centered in the first spacer bore 21, a plurality of axial channels 23 extending the length of the first spacer bore 21 protrude into the inner diameter of the first spacer 20.

At the first end 24 of the first spacer 20, adjacent the liner 4, is a first cylindrical flange 25 which forms one end of the first spacer 20. The surface 26 of the flange 25 which supports the liner 4 includes a plurality of end channels 27 which extend from the outer diameter of the first spacer 20 to the inner diameter thereof, where each end channel 27 connects with one of the axial channels 23. Adjacent the second end 28 of the first spacer 20, opposite the liner 4, is a second cylindrical flange 29 which may have a somewhat larger diameter than the first cylindrical flange 25. The second flange 29 is offset from the second end 28 of the first spacer 20, providing a stem 30 which extends through the hole 17 in the impingement plate 5 and supports the second flange 29 in spaced relation to the second spacer 31.

The length which the stem 30 protrudes from the second flange 29 is slightly greater than the thickness of the impingement plate 5, so that the second spacer 31 and the second flange 29 locate the impingement plate 5 therebetween without binding the impingement plate 5. This arrangement prevents distortion of the liner assembly 2 during operation of the nozzle despite large thermal variations between the liner 4 and the impingement plate 5. The diameters of the second flange 29 and the second spacer 31 are sufficiently large to ensure that, should the second cylindrical flange 29 and the second spacer 31 shift with respect to one another, the impingement plate 5 will remain located therebetween.

The second spacer 31 spaces the impingement plate 5 from the face 3 of the disk assembly X. The second spacer 31 has a second spacer bore 32 having essentially the same diameter as the first spacer bore 21, and includes a plurality of cooling channels 33 extending axially along the second spacer bore 32. Each end 34, 35 of the second spacer 31 includes a plurality of channels 36, 37 equally spaced angularly from each other which extend radially from the second spacer bore 32 and connect with one of the channels 33 at the inner diameter of the second spacer 31. The channels 33, 36, 37 of the second spacer 31 communicate with the second spacer plenum 38, the first spacer plenum 22, and the channels 23, 27 of the first spacer 20 to permit cooling air to circulate around the bolt shaft 9 and the liner 4 adjacent the recess 10. The bolt 6, spacers 20, 31, and nuts 19 are preferably made of HAYNES TM 25 alloy, a trademark of Cabot Corporation for an alloy containing by weight approximately 53.4% cobalt, 20.0% chromium, 10.0% nickel, 0.10% carbon, 15.0% tungsten, and 1.5% manganese.

Although this invention has been shown and described with respect to detailed embodiments thereof, it will be understood by those skilled in the art that various changes in form and detail thereof may be made without departing from the spirit and scope of the claimed invention.

We claim:

1. A convectively cooled bolt assembly for use in a high temperature environment, said assembly comprising:

a first spacer including first and second opposed ends with a first spacer bore extending therebetween, a plurality of radial cooling channels in said first end which communicate with said first spacer bore and extend radially outward therefrom, a first cooling flange adjacent said first end of said first spacer, and a second cooling flange offset from said second end of said first spacer;

a second spacer having two opposed faces with a second spacer bore extending therebetween, at least one of said two opposed faces includes a plurality of cooling channels which communicate with said second spacer bore, said first spacer bore communicates with said second spacer bore to provide for coolant flow from said plurality of cooling channels of said second spacer to said plurality of radial cooling channels of said first spacer;

a bolt having a head and a shaft attached thereto, said shaft extending through said first spacer bore and having a diameter which is significantly less than the first and second spacer bore diameters to permit coolant to flow therethrough; and, a nut threaded onto said shaft, said nut secures said second spacer to said first spacer;

wherein said first spacer has a stem which protrudes from said second flange and contacts said second spacer, said first spacer bore extends through said stem and said stem supports said second spacer in spaced relation to said second flange.

2. A convectively cooled bolt assembly for use in a high temperature environment, said assembly comprising:

a first spacer including first and second opposed ends with a first spacer bore extending therebetween, a plurality of radial cooling channels in said first end which communicate with said first spacer bore and extend radially outward therefrom, and axial cooling channels extending between said first and second opposed ends, and each of said plurality of radial cooling channels communicates with at least one of said axial cooling channels;

a second spacer having two opposed faces with a second spacer bore extending therebetween, at least one of said two opposed faces includes a plurality of cooling channels which communicate with said second spacer bore, and said first spacer bore communicates with said second spacer bore to provide for coolant flow from said plurality of cooling channels of said second spacer to said plurality of radial cooling channels of said first spacer;

a bolt having a head and a shaft attached thereto, said shaft extending through said first spacer bore and having a diameter which is significantly less than the first and second spacer bore diameters to permit coolant to flow therethrough; and, a nut threaded onto said shaft, said nut secures said second spacer to said first spacer.

3. The convectively cooled bolt assembly of claim 2 wherein said second spacer includes axial cooling channels which extend between said two opposed faces and communicate with said plurality of cooling channels.

4. The convectively cooled bolt assembly of claim 3 wherein each of said two opposed faces includes a plurality of cooling channels which communicate with said second spacer bore.

5. The convectively cooled bolt assembly of claim 4 wherein each of said axial cooling channels of said first spacer is integral with said first spacer bore.

6. The convectively cooled bolt assembly of claim 5 wherein each of said axial cooling channels of said second spacer is integral with said second spacer bore.

7. The convectively cooled bolt assembly of claim 6 wherein said first spacer includes
 a first cooling flange adjacent said first end of said first spacer,
 a second cooling flange offset from said second end of said first spacer, and
 a stem which protrudes from said second flange and contacts with second spacer, said first spacer bore extends through said stem, and said stem supports said second spacer in spaced relation to said second flange.

* * * * *

UNITED STATES PATENT AND TRADEMARK OFFICE
CERTIFICATE OF CORRECTION

PATENT NO. : 5,072,785

DATED : December 17, 1991

INVENTOR(S) : Jeffrey T. Dressler, Deane A. Beytes, Gunther Eichhorn

It is certified that error appears in the above-identified patent and that said Letters Patent is hereby corrected as shown below:

Column 1, line 52, delete the second "to"

Column 5, line 17, after "shaft," and before "said", insert --wherein--

Column 6, line 18, replace "with" with --said--

Signed and Sealed this

Eleventh Day of May, 1993

*Attest:*

MICHAEL K. KIRK

*Attesting Officer*    *Acting Commissioner of Patents and Trademarks*